United States Patent
Khalid et al.

(10) Patent No.: US 9,568,642 B1
(45) Date of Patent: Feb. 14, 2017

(54) PERMEABILITY AND INFLOW PERFORMANCE DETERMINATION FOR HORIZONTAL WELLS

(71) Applicant: KING FAHD UNIVERSITY OF PETROLEUM AND MINERALS, Dhahran (SA)

(72) Inventors: Muhammad Ali Khalid, Dhahran (SA); Sami Abdulaziz Alnuaim, Dhahran (SA); Muzammil Hussain Rammay, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 15/281,799

(22) Filed: Sep. 30, 2016

Related U.S. Application Data

(63) Continuation of application No. 14/132,375, filed on Dec. 18, 2013, now Pat. No. 9,470,086.

(51) Int. Cl.
*G01N 15/00* (2006.01)
*G01V 99/00* (2009.01)
(Continued)

(52) U.S. Cl.
CPC ......... *G01V 99/005* (2013.01); *E21B 41/0092* (2013.01); *E21B 47/06* (2013.01)

(58) Field of Classification Search
CPC ........ G06Q 50/22; G06Q 50/24; G06Q 50/28; G06F 19/345; G06F 19/704; G06F 17/2755; G06F 17/277; G06F 17/2785; G06F 17/2818; G06F 17/2872; G06F 17/289; G06F 19/20; G06F 19/3456; G06F 17/301
See application file for complete search history.

(56) References Cited

U.S. PATENT DOCUMENTS 6,101,447 A   8/2000   Poe, Jr.
7,089,167 B2  8/2006   Poe
(Continued)

FOREIGN PATENT DOCUMENTS

CN      202788797 U    3/2013
WO   WO 2004-076815 A1  9/2004

OTHER PUBLICATIONS

Aaron M. Cheng, "Development of General Inflow Performance Relationships (IPR's) for Slanted and Horizontal Wells Producing Heterogeneous Solution-Gas Drive Reservoirs", Apr. 1992, IIT Research Institute .

(Continued)

*Primary Examiner* — Roy Y Yi
(74) *Attorney, Agent, or Firm* — Oblon, McClelland, Maier & Neustadt, L.L.P.

(57) ABSTRACT

A method for assessing an inflow performance relationship for a horizontal well in heterogeneous solution gas drives reservoirs. A commercial simulator Eclipse is utilized to develop IPRs for horizontal wells producing oil from solution gas drive reservoirs. Firstly, a simulation model is developed where a base case is considered with typical rock, fluid and reservoir properties using a black oil model. Dimensionless IPR curves are generated by obtaining a set of points relating to flowing bottom-hole pressures to oil production rates. The effects of several reservoir and fluid properties such as bubblepoint pressure, oil gravity, residual oil saturation, critical gas saturation, initial water saturation, porosity and absolute permeabilities on the calculated curves are investigated. A new single empirical IPR model is obtained for horizontal wells producing oil from heterogeneous solution gas drive reservoirs suitable for systems with different reservoir permeability.

9 Claims, 8 Drawing Sheets

(51) Int. Cl.
*E21B 41/00* (2006.01)
*E21B 47/06* (2012.01)

(56) References Cited

U.S. PATENT DOCUMENTS

| | | |
|---|---|---|
| 8,244,509 B2 | 8/2012 | Banerjee et al. |
| 2010/0286917 A1 | 11/2010 | Hazlett et al. |
| 2010/0299124 A1 | 11/2010 | Sun et al. |

OTHER PUBLICATIONS

Albertus Retnanto and M.J. Economides, "Inflow Performance Relationships of Horizontal and Multibranched Wells in Solution-Gas-Drive Reservoir", Sep. 1998, SPE Annual Technical Conference and Exhibition, p. 239-248.

A.M. Cheng, "Inflow Performance Relationships for Solution-Gas-Drive Slanted/Horizontal Wells", Sep. 1990, 65$^{th}$ Annual Technical Conference and Exhibition of the Society of Petroleum Engineers; p. 77-84.

M.L. Wiggins and H.S. Wang, "A Two-Phase IPR for Horizontal Oil Wells", Apr. 2005, SPE Production and Operations Symposium.

Lyons, William C. Plisga, Gary J. (2005) Chapter 6 pp. 89-120. Standard Handbook of Petroleum and Natural Gas Engineering (2$^{nd}$ Edition). Elsevier.

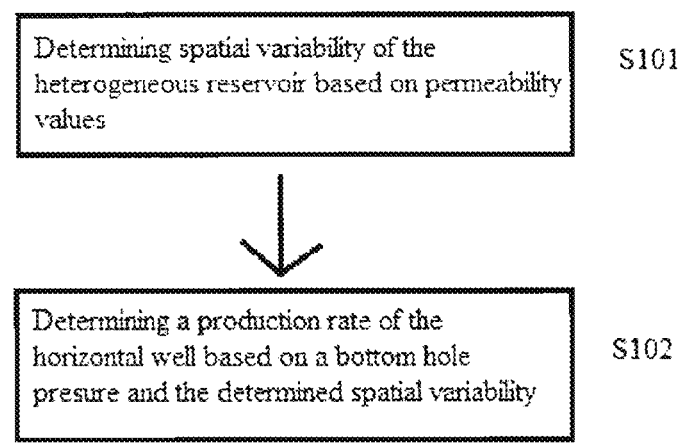
Figure 10: Flowchart for assessing IPR for a horizontal well

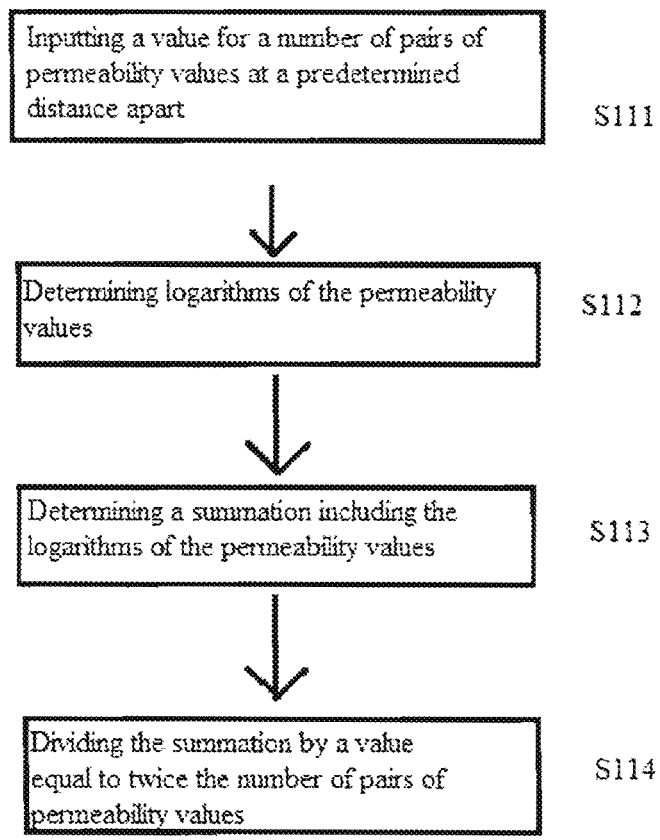
Figure 11: Flowchart for determining spatial variability for heterogeneous reservoirs

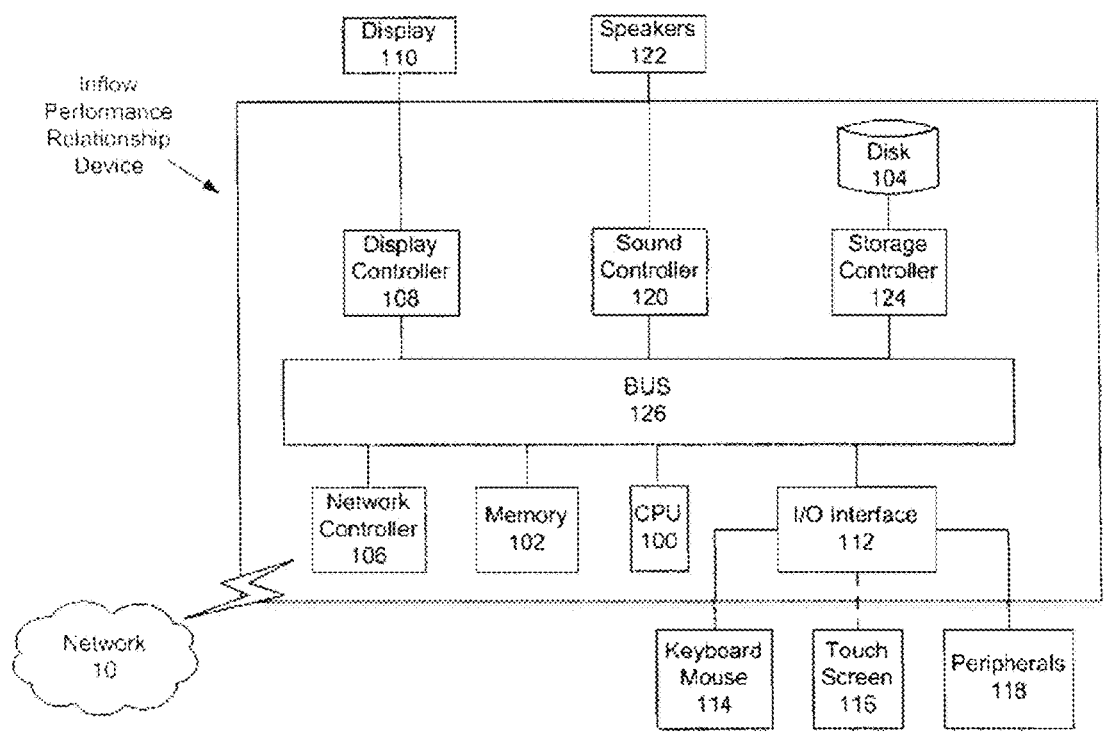
Figure 12: A hardware description of the inflow performance relationship device

PERMEABILITY AND INFLOW PERFORMANCE DETERMINATION FOR HORIZONTAL WELLS

CROSS-REFERENCE TO RELATED APPLICATIONS

This application is a continuation of Ser. No. 14/132,375, allowed.

FIELD OF THE DISCLOSURE

The invention pertains to the field of oil well productivity modeling, and more particularly, to modeling the inflow performance relationship for horizontal wells in heterogeneous solution gas drive reservoirs. More specifically, the invention pertains to assessing the inflow performance relationship by modeling the relationship between the flowing pressure of the horizontal well and the flowing rate of the horizontal well.

DESCRIPTION OF THE RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Oil well performance is a very important matter to oil companies due to its direct impact on their fields' total oil production and future development investment. Hence, it is essential to drill and maintain oil wells as healthy as possible. Oil well performance is measured by the assessment of its Inflow Performance & Outflow Performance Relationships (IPR & OPR, respectively). Since 1968, the Vogel equation has been used extensively for analyzing the IPR of flowing oil wells under a solution gas drive mechanism. However, the Vogel curve was originally developed for vertical wells and may not be applicable to horizontal wells due to the fact that the flow into a horizontal well, with an overlying gas cap, is different than flow into a vertical well. In addition, currently used inflow performance relationship models for horizontal wells are impractical in nature, mainly developed for homogeneous reservoirs, and not suitable for multi-layered systems with different permeability. Thus, there is a need for a new practical IPR model that considers the effects of reservoir heterogeneity on IPR curves for horizontal wells producing oil from two-phase reservoirs overlaid by a gas cap.

SUMMARY OF THE INVENTION

The invention investigates the effects of reservoir heterogeneity on IPR curves for horizontal wells drilled in heterogeneous solution gas drive reservoirs. To achieve the desired objective, a commercial simulator Eclipse is utilized to develop IPRs for horizontal wells producing oil from solution gas drive reservoirs. Firstly, a simulation model is developed where a base case is considered with typical rock, fluid and reservoir properties using a black oil model. Dimensionless IPR curves are generated by obtaining a set of points relating to flowing bottom-hole pressures to oil production rates. The effects of several reservoir and fluid properties such as bubblepoint pressure, oil gravity, residual oil saturation, critical gas saturation, initial water saturation, porosity and absolute permeabilities on the calculated curves are investigated.

Reservoir heterogeneity is included in the simulation model by incorporating a semi-variogram function. Finally, a new single empirical IPR model is obtained for horizontal wells producing oil from heterogeneous solution gas drive reservoirs suitable for systems with different reservoir permeability. The new empirical IPR model is then compared to published correlations and is found to have a small and acceptable average absolute error of less than 2%. Furthermore, the invention also shows that bubble point pressure has significant effect on dimensionless IPR curves. However, plots for other properties indicate that although the curves are not identical, they are similar in shape and demonstrate much less variance than the bubble point pressure plot. Therefore, these properties have only a minor effect on calculated, dimensionless IPR curves.

An embodiment of the present disclosure includes a method of assessing an inflow performance relationship (IPR) for a horizontal well producing from heterogeneous solution gas drive reservoirs.

A further embodiment of the present disclosure includes a method of assessing an inflow performance relationship (IPR) for a horizontal well that includes inputting permeability values of a heterogeneous reservoir; determining spatial variability of the heterogeneous reservoir based on the permeability values; measuring a bottom hole pressure of the horizontal well; and determining a production rate of the horizontal well based on the measured bottom hole pressure and the determined spatial variability.

A further embodiment of the present disclosure includes determining the production rate based on at least one of reservoir flowing composition, well characteristics, existence of well zones, behavior of fluid phases under reservoir flowing conditions and an average pressure of the heterogeneous reservoir.

A further embodiment of the present disclosure includes determining the spatial variability of the heterogeneous reservoir includes inputting a value for a number of pairs of permeability values at a predetermined distance apart; determining logarithms of the permeability values; determining a summation including the logarithms of the permeability values; and dividing the summation by a value equal to twice the number of pairs of permeability values.

A further embodiment of the present disclosure includes determining the summation including the logarithms of the permeability may include determining the logarithms of permeability values; determining squared differences between the logarithms of permeability values; and determining the sum of the squared differences between the logarithms of permeability values.

According to an embodiment of the present disclosure the spatial variability of the heterogeneous reservoir may be calculated using the equation $$\gamma(h) = \frac{1}{2n(h)} \sum_{i=1}^{n(h)} [\log(k)_{i+1} - \log(k)_i]^2$$

where n(h) corresponds to a number of pairs of permeability values at distance h (lag distance) apart and k corresponds to one of the permeability values.

According to an embodiment of the present disclosure the production rate of the horizontal well in heterogeneous solution gas reservoir may be calculated using the equation $$qo/qomax = 1 - (0.63788 - 0.0278\gamma)\left(\frac{Pwf}{Pr}\right) - (0.0278\gamma + 0.36212)\left(\frac{Pwf}{Pr}\right)^2$$

where, $\gamma$ corresponds to a spatial variability value, and $$\frac{Pwf}{Pr}$$

corresponds to a ratio of the bottom hole pressure and an average reservoir pressure of the heterogeneous reservoir.

Another embodiment of the present invention includes a computer implemented method for assessing an inflow performance relationship (IPR) for a horizontal well that includes determining, on a computer processor, spatial variability of a heterogeneous reservoir based on permeability values and saving spatial variability in a computer memory; and determining, on a computer processor, a production rate of the horizontal well based on a bottom hole pressure and the determined spatial variability and saving production rate in the computer memory.

According to an embodiment of the present disclosure the permeability values of the heterogeneous reservoir are read into the computer memory and wherein the bottom hole pressure is read into the computer memory.

According to an embodiment of the present disclosure may include an input performance relationship device comprising a computer usable medium having a processing circuitry stored therein for causing a computer to perform a method of assessing an inflow performance relationship (IPR) for a horizontal well, the processing circuitry configured to receive permeability values of a heterogeneous reservoir; determine spatial variability of the heterogeneous reservoir based on the permeability values; and determine a production rate of the horizontal well based on a bottom hole pressure and the determined spatial variability.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 10 illustrates a flowchart for assessing IPR for a horizontal well.

FIG. 11 illustrates a flowchart for determining spatial variability for heterogeneous reservoirs.

FIG. 12 shows a hardware description of the inflow performance relationship device.

DETAILED DESCRIPTION OF THE EMBODIMENTS

Figure 1:
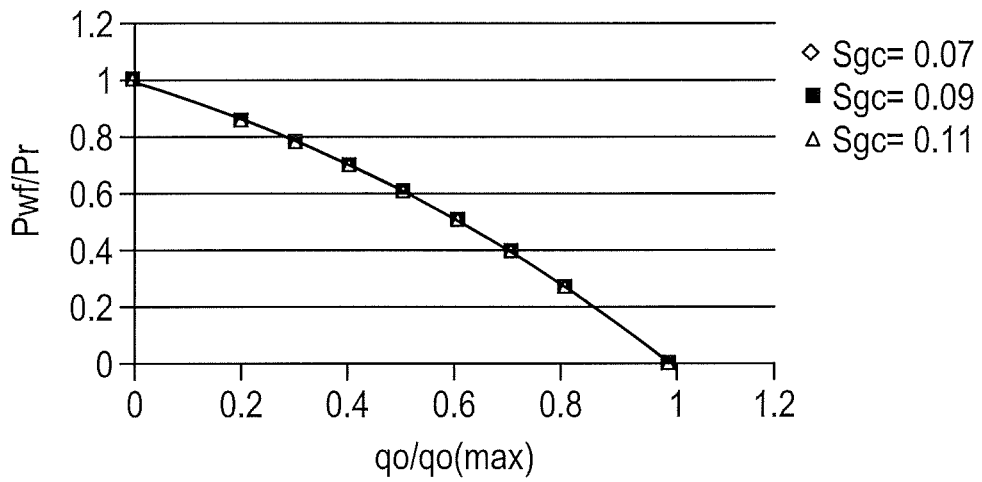
FIG. 1 shows an effect of critical gas saturation on a dimensionless IPR curve.
Figure 2:
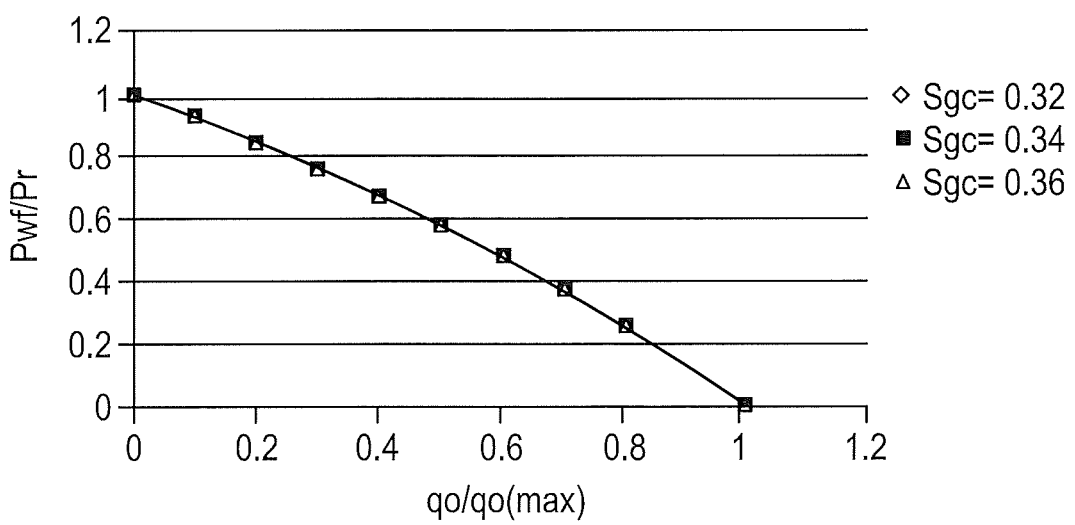
FIG. 2 shows an effect of residual oil saturation on a dimensionless IPR curve.
Figure 3:
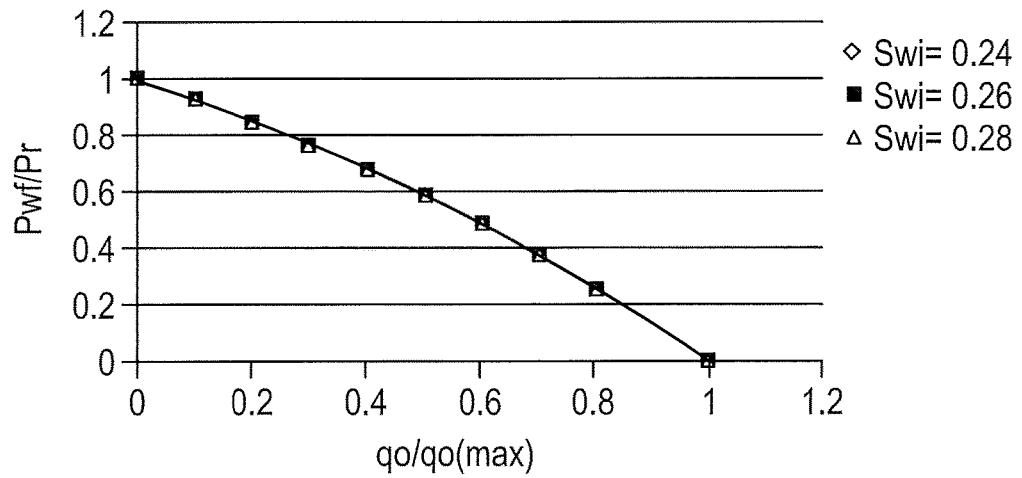
FIG. 3 shows an effect of initial water saturation on a dimensionless IPR curve.
Figure 4:
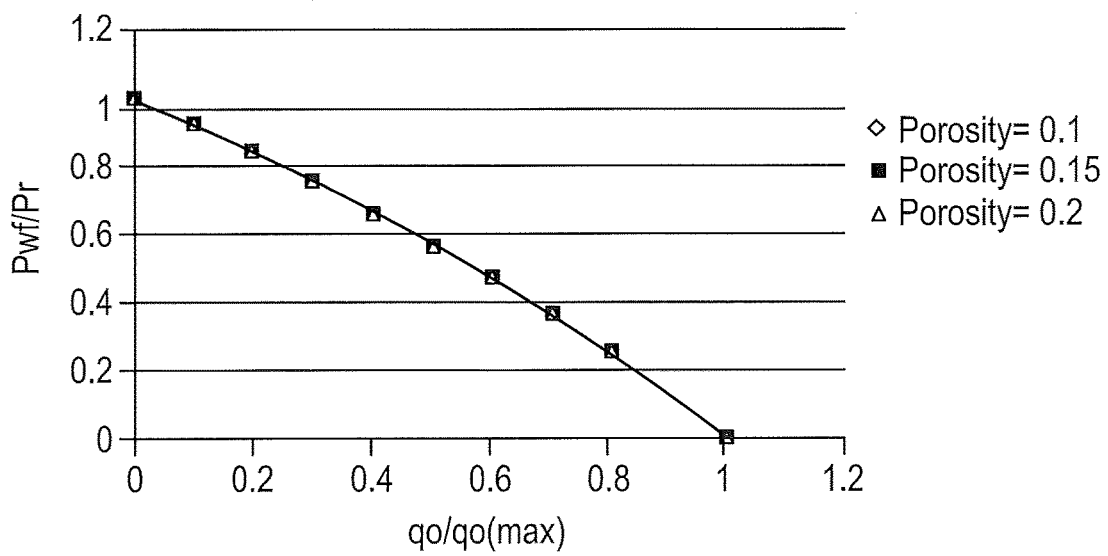
FIG. 4 shows an effect of porosity on a dimensionless IPR curve.
Figure 5:
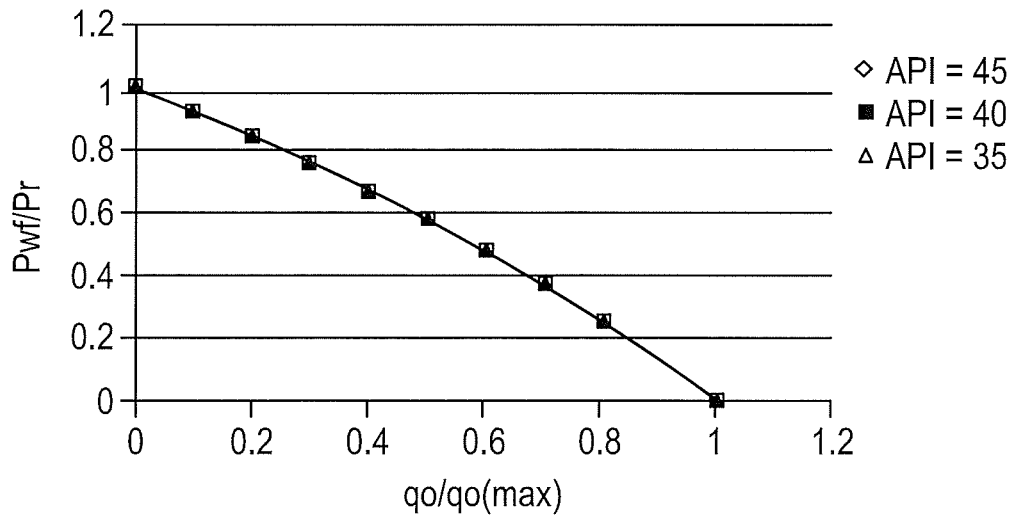
FIG. 5 shows an effect of API gravity on a dimensionless IPR curve.
Figure 6:
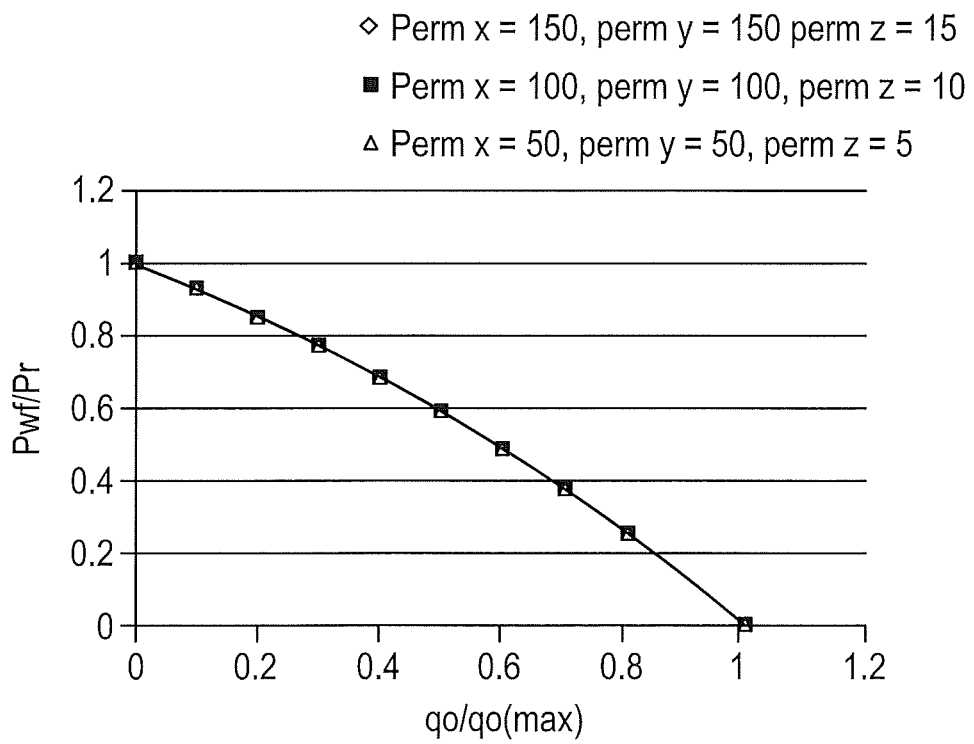
FIG. 6 shows an effect of permeability on a dimensionless IPR curve.
Figure 7:
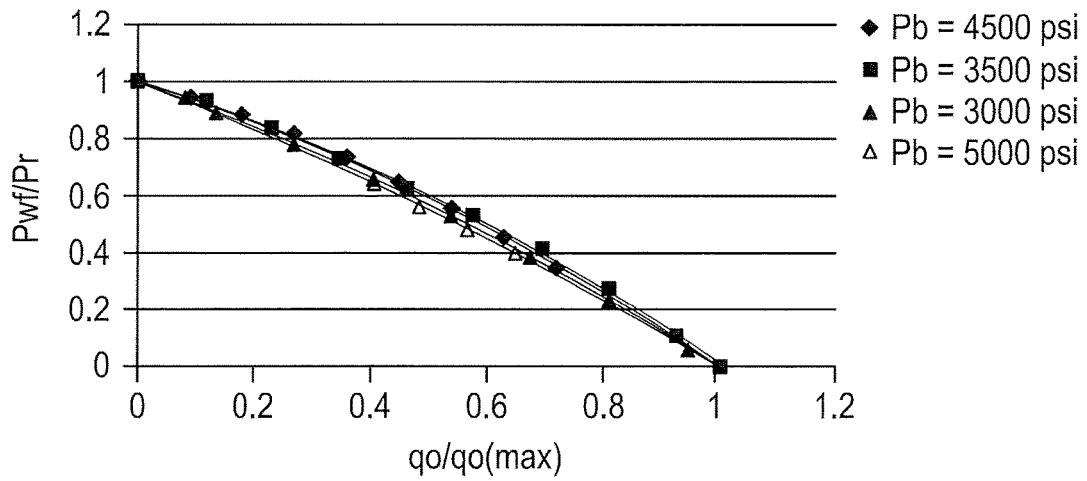
FIG. 7 shows an effect of bubble point pressure on a dimensionless IPR curve.

Referring now to the drawings, wherein like reference numerals designate identical or corresponding parts throughout the several views.

Deliverability of a well is analyzed by estimating the production rate for any given bottom hole pressure. Bottom hole pressure is the pressure at a sand face of the reservoir in the well. Inflow into a well is directly proportional to a pressure drop between the reservoir and the wellbore and can be represented by the straight line IPR relationship for single-phase under-saturated reservoirs. However, this relationship is no longer linear in two-phase flow of oil and gas in saturated oil systems.

To decide whether to drill a conventional vertical or a horizontal well, the type of well that will result in the highest productivity and economic return must be selected. Common practice in the oil industry for making this selection is to calculate well productivity by using the well inflow performance relationship (IPR). IPR of a well is an essential tool to assess the well performance as it indicates the production behavior of a well and assists in determining the feasibility of a producing well. The IPR curve visualizes the relationship between the well's producing bottom hole pressures and its corresponding oil production rates under a given reservoir condition. The shape of the curve is influenced by many factors such as the reservoir fluid composition, well characteristics, existence of well zones and behavior of fluid phases under reservoir flowing conditions. The simplest and most widely used IPR is the straight-line IPR, implying that the rate is directly proportional to the pressure drawdown for under-saturated reservoirs. The constant of proportionality is defined as the "Productivity Index" (PI), another way to define inflow performance. One of the main objectives of production engineering is to maximize PI which can be obtained by maximizing the flow rate for a given pressure drawdown.

Horizontal drilling has rapidly come into its own as a viable alternative to conventional exploration and production techniques. In the late 70's and early 80's, with oil prices around $35 a barrel, interest in horizontal wells was reignited. With technological advances in horizontal well drilling, horizontal well technology has emerged as a promising method to boost well productivity and reserves. The purpose of the horizontal wells was to enhance well productivity, reduce water and gas coning, intersect natural fractures and to improve well economics. For Horizontal Wells, Inflow performance serves as an important component with outflow performance to quantify hydrocarbon production from a reservoir. Both IPR & OPR are essential factors to generate a well deliverability curve which enables to predict an optimal well production rate under certain operating conditions. The application of horizontal drilling technology made the prior set of well equation rules obsolete, as hydrocarbon reservoirs are typically laterally extensive but thin. The proximity of reservoir boundaries in horizontal wells required new relationships since the set of well equations for vertical wells may not be applicable to horizontal wells.

Inflow performance relationships of horizontal wells are different than the ones for vertical wells. The two most pronounced factors for horizontal wells are flow streamline and permeability. Flow streamline is a combination of radial flow and linear flow with linear flow dominating and, permeability includes not only horizontal permeability, but also vertical permeability. Therefore the anisotropic ratio of the reservoir becomes important when modeling a horizontal well performance. These yield additional difficulty to obtain analytical models of horizontal well inflow performance. In addition, using a single-phase inflow relationship (straight line IPR) to predict a two-phase flow well performance can result in significant deviation in flow rate and pressure distribution in the wellbore, and deliver misleading information for well performance and decision making.

Several investigators have utilized reservoir simulators to study the behavior of a horizontal well producing from oil solution gas-drive reservoirs. These investigations have led to proposed empirical inflow performance relationships (IPRs) to predict the rate-pressure behavior of horizontal oil wells. However, all the previously developed IPR models for horizontal wells assume homogeneous reservoirs and are not suitable for a multilayered reservoir with varying permeability. Therefore, the available IPR relationships do not provide accurate performance of such reservoirs. It is the object of this invention to consider the effects of reservoir heterogeneity on IPR curves for horizontal wells producing oil from solution gas-drive reservoirs. Accordingly, a new empirical model is generated for such reservoirs, which is discussed in more detail below.

The following describes a reservoir model and grid characteristics. Eclipse, a three phase, three dimensional, general purpose black oil simulator is used for modeling solution gas-drive reservoirs. A horizontal well is placed in the center of the reservoir. There are 15 cells in x-direction, 15 cells in y-direction and 5 cells in z-direction representing a reservoir. The size of a grid in the x-direction is 500 feet (per grid), 500 feet (per grid) in the y-direction and 50 feet (per grid) in the z-direction. The location of the well is shown in Table 1 below.

TABLE 1

Location of Well

| $X_1$ | $X_2$ | $Y_1$ | $Y_2$ | $Z_1$ | $Z_2$ |
|---|---|---|---|---|---|
| 6 | 10 | 8 | 8 | 3 | 3 |

The following describes reservoir characteristics. A base case is modeled as a box-shaped reservoir with a constant thickness of 250 ft. The porous medium has a homogeneous porosity of 0.25 allowing areal permeability isotropy and vertical anisotropy with values in x, y and z directions of 200, 200 and 50 md, respectively. A horizontal well of radius 0.33 ft is located in the middle of the reservoir. A constant and immobile water saturation of 22% is assigned to all cases. A bubble point pressure of 4000 psi (pounds per square inch) is used in all cases. The black oil properties used for the base case are shown in Table 2 below. The base case data used for IPR developments is shown in Table 3 below. Non-darcy flow effects and capillary pressure effects are neglected. Neither damage nor stimulation is present in the vicinity of the wellbore ($R_s$ is solution gas oil ratio, $B_o$ is oil formation volume factor, $B_g$ is gas formation volume factor, $\mu_o$ is oil viscosity, and $\mu_g$ is gas viscosity).

TABLE 2

Reservoir fluid properties data

| P psi | $R_s$ SCF/STB | $B_o$ bbl/STB | $B_g$ SCF/bbl | $\mu_o$ cp | $\mu_g$ cp |
|---|---|---|---|---|---|
| 14.7 | 1.34 | 1.0488 | 4.735205 | 2.7463 | 0.011799 |
| 280.38 | 44.26 | 1.0691 | 93.7407 | 2.1087 | 0.012107 |
| 546.07 | 97.64 | 1.0943 | 189.5318 | 1.6657 | 0.012543 |
| 811.76 | 156.32 | 1.122 | 292.2744 | 1.3725 | 0.013062 |
| 1077.44 | 218.77 | 1.1516 | 401.558 | 1.1684 | 0.013656 |
| 1343.13 | 284.19 | 1.1825 | 516.099 | 1.0193 | 0.014321 |
| 1608.82 | 352.09 | 1.2146 | 633.557 | 0.9059 | 0.015059 |
| 1874.5 | 422.13 | 1.2477 | 750.812 | 0.8168 | 0.015872 |
| 2140.19 | 494.06 | 1.2817 | 864.66 | 0.7451 | 0.016764 |
| 2405.88 | 567.68 | 1.3166 | 972.524 | 0.6861 | 0.017739 |
| 2671.57 | 642.84 | 1.3521 | 1072.83 | 0.6366 | 0.018804 |
| 2937.25 | 719.41 | 1.3883 | 1164.945 | 0.5945 | 0.019966 |
| 3202.94 | 797.29 | 1.4251 | 1248.922 | 0.5583 | 0.021231 |
| 3468.63 | 876.39 | 1.4625 | 1325.212 | 0.5268 | 0.022608 |
| 3734.31 | 956.63 | 1.5005 | 1394.469 | 0.4991 | 0.024106 |

TABLE 3

Reservoir data

| Variable | Base Case Values | Units |
|---|---|---|
| Bubble Point Pressure | 4000 | Psi |
| Oil Gravity | 50 | API* |
| Reservoir "x" coordinate | 7500 | ft. |
| Reservoir "y" coordinate | 7500 | ft. |
| Reservoir thickness | 250 | ft. |
| Permeability-x direction | 200 | md |
| Permeability-y direction | 200 | md |
| Permeability-z direction | 20 | md |
| Porosity | 25 | % |
| Critical gas saturation | 5 | % |
| Residual Oil Saturation | 30 | % |
| Initial water saturation | 22 | % |
| Well diameter | 0.6667 | ft. |
| Well length | 2500 | ft. |
| Gas density | 0.06 | lb/ft$^3$ |

Bottom-hole pressure and production rates are required for IPR calculations. The simulation results were generated starting from an initial pressure that is less than the bubble point pressure. Dimensionless IPR curves were generated by dividing the pressure coordinate of each point on an IPR curve by the average reservoir pressure and the oil rate coordinate by the maximum oil rate, corresponding to 100% pressure drawdown. Dimensionless IPR curves are made in order to compare their curvature or the rate of change of oil production rate with flowing bottom hole pressure.

Two types of simulation runs are examined. In the first simulation run, the well is constrained by a constant flowing bottom-hole pressure. In the second simulation run, a constant oil production rate is specified. For the same number of simulation runs, constant pressure runs result in better IPR curve resolution than constant oil rate runs. For this reason, all runs were done at a constant wellbore pressure constraint. The performance of each case was simulated using 9 different bottom-hole pressures as illustrated in Table 4 below.

TABLE 4

Bottomhole pressures

| No. | $P_{wf}$ |
|---|---|
| 1 | 14.7 |
| 2 | 400 |
| 3 | 800 |
| 4 | 1200 |
| 5 | 1600 |
| 6 | 2000 |
| 7 | 2400 |
| 8 | 2800 |
| 9 | 3200 |

FIGS. 1 through 7 show the effects of several variables on generated IPR curves. The effects of bubble point pressure, oil gravity, residual oil saturation, critical gas saturation, initial water saturation, porosity and absolute permeability are investigated. It is clear that bubble point pressure has a significant effect on dimensionless IPR curves. However, plots for other properties indicate that although the curves are not identical, they are similar in shape and demonstrate much less variance than the bubble point pressure plot. Therefore, these variables have only minor effect on calculated, dimensionless IPR curves.

An embodiment of the present invention includes permeability variations in the simulation model. For example, a horizontal well is placed in 5 z-direction (layers) grids, and heterogeneity is added in each of the grids by assuming different permeability values ranging from 0.1 md to 5000 md. Dykstra Parson (1950) coefficient, $V_{Dp}$, was considered as a non-spatial measure of heterogeneity. The method, using the Dykstra Parson coefficient, assumes that permeability data is log-normal distributed. However, spatial correlation of permeability data (permeability values and permeability data are used interchangeably in the disclosure) is important for heterogeneous reservoirs. The semi-variogram, $\gamma(h)$, is one way to measure or quantify spatial variability/continuity. For logarithms of permeability data, log (k), a semi variogram is defined as:

$$\gamma(h) = \frac{1}{2n(h)} \sum_{i=1}^{n(h)} [\log(k)_{i+1} - \log(k)_i]^2$$

Where n (h) is the number of pairs of permeability values at distance h (lag distance) apart and k represents a permeability value at i or i+1. Alternatively, if permeability values are not known, $\gamma$ (semi-variogram) can be estimated by multi-rate well test.

Figure 8:
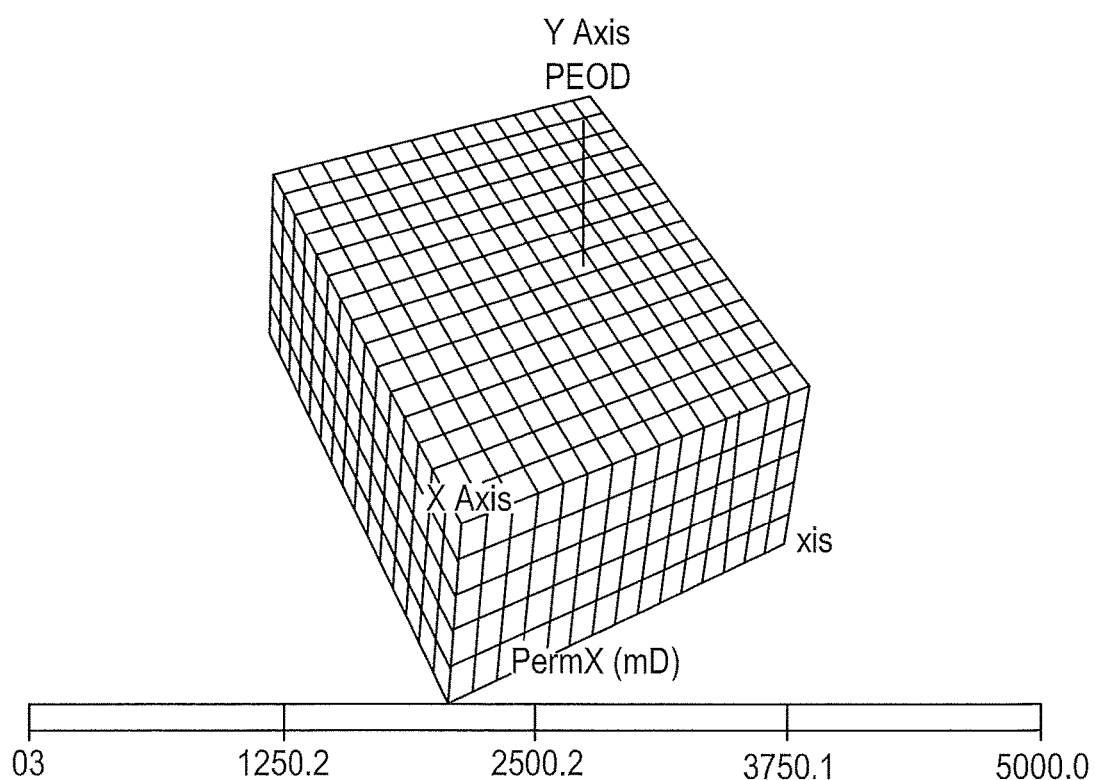
FIG. 8 shows an inclusion of reservoir heterogeneity in a simulation model generated by the Eclipse simulator.

A total of ten cases of different permeability values are used. FIG. 8 shows a simulator generated image when spatial permeability variations are included in the simulation model. The simulation model with added spatial permeability variations (heterogeneity) is run and dimensionless IPR curves are plotted for each case. Moreover, a semi-variogram value is calculated for each case. The calculated semi-variogram values represent the spatial variability of the permeability data points for that particular case.

Figure 9:
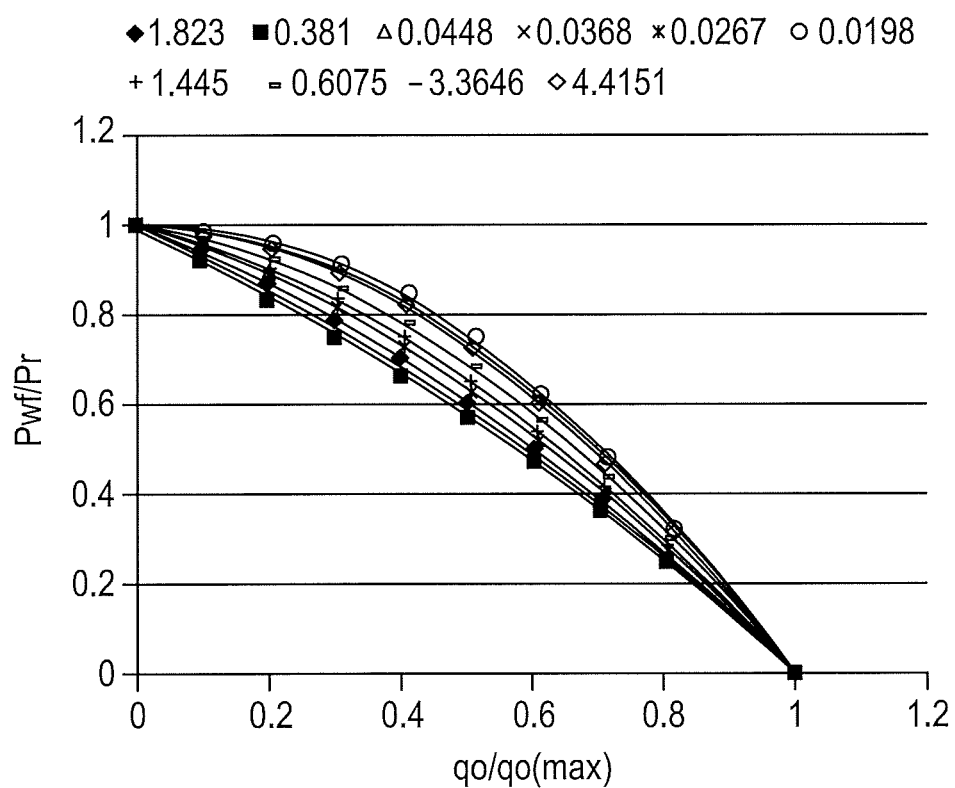
FIG. 9 shows an effect of reservoir heterogeneity (permeability variations) on a dimensionless IPR curve.

FIG. 9 depicts the effect of different spatial permeability variations (reservoir heterogeneity) on dimensionless IPR curves plotted for ten assumed cases. As heterogeneity values are changing, there is a deviation in the curvature of the dimensionless IPR curve. Moreover, the shape of IPR curve is not similar to those of homogenous reservoirs.

A new IPR model is developed that considers the effect of permeability variations in two-phase horizontal wells. Linear regression techniques are applied to develop an empirical equation that fits dimensionless flowrate as a function of dimensionless pressure. The following empirical equation is found to best fit the IPR data obtained from simulation for horizontal wells producing oil from heterogeneous solution gas-drive reservoirs given as:

$$\frac{q_o}{q_{o(max)}} = 1 - (0.63788 - 0.0278\gamma)\left(\frac{Pwf}{Pr}\right) - (0.0278\gamma + 0.36212)\left(\frac{Pwf}{Pr}\right)^2$$

In the above proposed IPR model, '$\gamma$' represents the semi-variogram function, $q_o$ represents the oil flow rate, $q_{o(max)}$ represents the maximum oil flow rate, Pwf represents the bottom hole pressure and Pr represents the average reservoir pressure. Moreover, the above equation can be used for homogeneous reservoirs by substituting zero in the semi-variogram function.

The above-illustrated IPR model is then compared to the published correlations of Cheng, Retnanto & Economides, Harrison and Wiggins (hereby incorporated by reference), using simulation results of three data sets for different heterogeneities. Table 5 presents the summary of the statistical accuracy of the above-illustrated IPR model with other published correlations. It is evident from the table that the empirical IPR model is in good agreement with the actual obtained data when compared to the above-noted published correlations, as evidenced by an acceptable absolute average error of less than 2%.

TABLE 5

Comparison of statistical accuracy for IPR correlation

| Author | Data Set | Abs Average Error | Relative Error | St. Dev. |
|---|---|---|---|---|
| Cheng | 01 | 23.391 | −23.05 | 15.48 |
| | 02 | 20.917 | −20.58 | 13.94 |
| | 03 | 22.267 | −21.93 | 14.75 |
| Retnanto & | 01 | 17.26 | −17.26 | 12.55 |
| Economides | 02 | 14.92 | −14.92 | 11.15 |
| | 03 | 16.23 | −16.23 | 11.92 |
| Harrison | 01 | 13.72 | −13.72 | 11.18 |
| | 02 | 11.47 | −11.47 | 9.92 |
| | 03 | 12.72 | −12.72 | 10.63 |
| Wiggins | 01 | 86.44 | −86.44 | 91.23 |
| | 02 | 82.87 | −82.87 | 89.05 |
| | 03 | 85.15 | −85.15 | 90.89 |
| Proposed IPR | 01 | 1.68 | 1.68 | 1.43 |
| Model | 02 | 1.91 | 16.44 | 9.44 |
| | 03 | 0.25 | −0.08 | 0.44 |

Next, flowcharts with regard to the present invention will be described with respect to the above-described equations. In FIG. 10, a flowchart is illustrated with regard to the assessment of an IPR for a horizontal well. In step S 101, spatial variability of the heterogeneous reservoir is determined based on permeability values. Permeability values are input for the heterogeneous reservoir. As noted above, the semi-variogram, $\gamma(h)$, is one way to measure or quantify spatial variability/continuity. In step S102, a production rate is determined based a bottom hole pressure and the determined spatial variability. The equation that is found to best fit the production rate data for horizontal wells is shown below:

$$\frac{q_o}{q_{o(max)}} = 1 - (0.63788 - 0.0278\gamma)\left(\frac{Pwf}{Pr}\right) - (0.0278\gamma + 0.36212)\left(\frac{Pwf}{Pr}\right)^2,$$

where $q_o$ is the oil flow rate, $q_{o(max)}$ is the maximum oil flow rate, $\gamma$ is the semi-variogram value, Pwf is the bottom hole pressure and Pr is the average reservoir pressure.

In FIG. 11, a flowchart is illustrated with regard to determining spatial variability for heterogeneous reservoirs. A value for a number of pairs of permeability values at a predetermined distance apart is input in step S111. Additionally, logarithms of the permeability values and a summation including the logarithms of the permeability values are determined in steps S112 and S113. Finally, in step S114, the summation is divided by a value equal to twice the number of pairs of permeability values. The following equation more clearly quantifies spatial variability:

$$\gamma(h) = \frac{1}{2n(h)} \sum_{i=1}^{n(h)} [\log(k)_{i+1} - \log(k)_i]^2,$$

where $n(h)$ is the number of pairs of permeability values at distance h (lag distance) apart, and $\log(k)$ is the logarithm of permeability data.

Next, a hardware description of the Inflow performance relationship device according to exemplary embodiments is described with reference to FIG. 12. In FIG. 12, the Inflow performance relationship device includes a CPU 100 which performs the processes described above. The process data and instructions may be stored in memory 102. These processes and instructions may also be stored on a storage medium disk 104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the Inflow performance relationship device communicates, such as a server or computer.

Further, the claimed advancements may be provided as a utility application, background daemon, or component of an operating system, or combination thereof, executing in conjunction with CPU 100 and an operating system such as Microsoft Windows 7, UNIX, Solaris, LINUX, Apple MAC-OS and other systems known to those skilled in the art.

CPU 100 may be a Xenon or Core processor from Intel of America or an Opteron processor from AMD of America, or may be other processor types that would be recognized by one of ordinary skill in the art. Alternatively, the CPU 100 may be implemented on an FPGA, ASIC, PLD or using discrete logic circuits, as one of ordinary skill in the art would recognize. Further, CPU 100 may be implemented as multiple processors cooperatively working in parallel to perform the instructions of the inventive processes described above.

The Inflow performance relationship device in FIG. 12 also includes a network controller 106, such as an Intel Ethernet PRO network interface card from Intel Corporation of America, for interfacing with network 10. As can be appreciated, the network 10 can be a public network, such as the Internet, or a private network such as an LAN or WAN network, or any combination thereof and can also include PSTN or ISDN sub-networks. The network 10 can also be wired, such as an Ethernet network, or can be wireless such as a cellular network including EDGE, 3G and 4G wireless cellular systems. The wireless network can also be WiFi, Bluetooth, or any other wireless form of communication that is known.

The Inflow performance relationship device further includes a display controller 108, such as a NVIDIA GeForce GTX or Quadro graphics adaptor from NVIDIA Corporation of America for interfacing with display 110, such as a Hewlett Packard HPL2445w LCD monitor. A general purpose I/O interface 112 interfaces with a keyboard and/or mouse 114 as well as a touch screen panel 116 on or separate from display 110. General purpose I/O interface also connects to a variety of peripherals 118 including printers and scanners, such as an OfficeJet or DeskJet from Hewlett Packard.

A sound controller 120 is also provided in the Inflow performance relationship device, such as Sound Blaster X-Fi Titanium from Creative, to interface with speakers/microphone 122 thereby providing sounds and/or music.

The general purpose storage controller 124 connects the storage medium disk 104 with communication bus 126, which may be an ISA, EISA, VESA, PCI, or similar, for interconnecting all of the components of the Inflow performance relationship device. A description of the general features and functionality of the display 110, keyboard and/or mouse 114, as well as the display controller 108, storage controller 124, network controller 106, sound controller 120, and general purpose I/O interface 112 is omitted herein for brevity as these features are known.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. A method for assessing an inflow performance relationship (IPR) for a horizontal well in heterogeneous solution gas drive reservoirs, comprising:
   inputting permeability values of a heterogeneous reservoir;
   determining spatial variability of the heterogeneous reservoir based on the permeability values, wherein determining the spatial variability of the heterogeneous reservoir includes
      inputting a value for a number of pairs of permeability values at a predetermined distance apart,
      determining a summation including logarithms of the permeability values, and
      dividing the summation by a value equal to twice the number of pairs of permeability values;
   determining a spatial correlation of the permeability values as a semi variogram defined as:

$$\gamma(h) = \frac{1}{2n(h)} \sum_{i=1}^{n(h)} [\log(k)_{i+1} - \log(k)_i]^2$$

where n (h) is a number of pairs of permeability values at a lag distance h apart and k represents a permeability value at i or i+1;

measuring a bottom hole pressure of the horizontal well; and determining a production rate of the horizontal well based on a bottom hole pressure and the determined spatial variability.

2. The method for assessing the IPR for a horizontal well as claimed in claim 1, wherein the determining the summation including the logarithms of the permeability includes:

determining the logarithms of permeability values;

determining squared differences between the logarithms of permeability values; and determining the sum of the squared differences between the logarithms of permeability values.

3. The method for assessing the IPR for a horizontal well as claimed in claim 1, wherein the determining the summation including the logarithms of the permeability includes:

determining a value for $$\Sigma_{i=1}^{n(h)}[\log(k)_{i+1} - \log(k)_i]^2,$$

wherein, n(h) corresponds to the number of pairs of permeability values at h distance apart and k corresponds to one of the permeability values.

4. The method for assessing the IPR for a horizontal well as claimed in claim 1, wherein determining the spatial variability of the heterogeneous reservoir includes:

determining a value for $$\frac{1}{2n(h)} \sum_{i=1}^{n(h)} [\log(k)_{i+1} - \log(k)_i]$$

wherein, n(h) corresponds to a number of pairs of permeability values at h distance apart and k corresponds to one of the permeability values.

5. The method for assessing the IPR for a horizontal well as claimed in claim 1, wherein the determining the production rate of the horizontal well is further based on an average pressure of the heterogeneous reservoir.

6. The method of assessing the IPR for a horizontal well as claimed in claim 1, wherein the determining the production rate of the horizontal well includes:

determining a value for $$\frac{q_o}{q_{o(max)}} = 1 - (0.63788 - 0.0278\gamma)\left(\frac{P_{wf}}{P_r}\right) - (0.0278\gamma + 0.36212)\left(\frac{P_{wf}}{P_r}\right)^2,$$

wherein, γ corresponds to a spatial variability value, and $$\frac{P_{wf}}{P_r}$$

corresponds to a ratio of the bottom hole pressure and an average pressure of the heterogeneous reservoir.

7. The method for assessing the IPR for a horizontal well as claimed in claim 6, wherein the spatial variability value is determined by:

determining a value for $$\frac{1}{2n(h)} \sum_{i=1}^{n(h)} [\log(k)_{i+1} - \log(k)_i]^2,$$

wherein, n(h) corresponds to a number of pairs of permeability values at h distance apart and k corresponds to one of the permeability values.

8. The method for assessing the IPR for a horizontal well as claimed in claim 6, wherein the production rate for a homogenous well is determined by substituting zero for γ in the equation:

$$1 - (0.63788 - 0.0278\gamma)\left(\frac{P_{wf}}{P_r}\right) - (0.0278\gamma + 0.36212)\left(\frac{P_{wf}}{P_r}\right)^2.$$

9. The method for assessing the IPR for a horizontal well as claimed in claim 1, wherein the horizontal well is a two-phase horizontal well.

* * * * *